(12) United States Patent
Tekawy et al.

(10) Patent No.: US 7,978,133 B1
(45) Date of Patent: *Jul. 12, 2011

(54) GPS GYRO CALIBRATION

(75) Inventors: Jonathan A Tekawy, Newport, CA (US); Kevin M O'Brien, San Diego, CA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/708,424

(22) Filed: Feb. 18, 2010

Related U.S. Application Data

(63) Continuation of application No. 11/420,427, filed on May 25, 2006, now Pat. No. 7,667,645.

(51) Int. Cl.
*H04B 7/185* (2006.01)
(52) U.S. Cl. .................................................. 342/358
(58) Field of Classification Search .. 342/357.39–357.4, 342/359–360, 357.2–357.78, 358
See application file for complete search history.

(56) References Cited

U.S. PATENT DOCUMENTS

| | | | |
|---|---|---|---|
| 5,241,319 A | 8/1993 | Shimizu | |
| 5,258,764 A | 11/1993 | Malinowski | |
| 7,221,317 B2 | 5/2007 | Tekawy et al. | |
| 7,256,734 B2 | 8/2007 | Tekawy et al. | |
| 7,397,422 B2 | 7/2008 | DiEsposti et al. | |
| 7,423,585 B2 | 9/2008 | Tekawy et al. | |
| 7,492,314 B2 | 2/2009 | DiEsposti et al. | |
| 7,667,645 B2 * | 2/2010 | Tekawy et al. | 342/359 |
| 2003/0135327 A1 | 7/2003 | Levine et al. | |
| 2005/0007275 A1 | 1/2005 | Fowell et al. | |
| 2007/0045637 A1 | 3/2007 | Tekawy et al. | |
| 2007/0273580 A1 | 11/2007 | Tekawy et al. | |

OTHER PUBLICATIONS

Jonathan A. Tekawy, Precision Spacecraft Attitude Estimators Using an Optical Payload Pointing System, Journal of Spacecraft and Rockets, vol. 35, No. 4, Jul.-Aug. 1998.

* cited by examiner

*Primary Examiner* — Thomas H Tarcza
*Assistant Examiner* — Nga X Nguyen
(74) *Attorney, Agent, or Firm* — Caven & Aghevli LLC

(57) ABSTRACT

GPS gyro calibration methods and systems are described. In an embodiment, a ground station can receive antenna position data for a spot beam antenna from a global positioning system (GPS) platform where the antenna position data indicates a boresight direction of the spot beam antenna. GPS-enabled receiver(s) can receive scan signals transmitted via the spot beam antenna of the GPS platform, and the GPS-enabled receivers can determine signal power measurements for each of the scan signals. The ground station can receive the signal power measurements from the GPS-enabled receiver(s) and estimate a pointing error of the spot beam antenna based on the signal power measurements and the antenna position data received from the GPS platform. The ground station can then determine gyro calibration parameters from the estimated pointing error and communicate the gyro calibration parameters to the GPS platform to calibrate for gyro drift errors.

32 Claims, 5 Drawing Sheets

GPS GYRO CALIBRATION

RELATED APPLICATIONS

This application is a continuation of U.S. patent application Ser. No. 11/420,427 to Tekawy, et al., filed May 25, 2006 now U.S. Pat. No. 7,667,645, the disclosure of which is incorporated herein by reference in its entirety.

TECHNICAL FIELD

The present disclosure relates to global positioning system (GPS) gyro calibration, and specifically to GPS platform gyro calibration utilizing a spot beam antenna system and one or more GPS-enabled receivers.

BACKGROUND

The global positioning system (GPS) is a satellite-based system that is relied upon to provide accurate positioning information to GPS-enabled receivers, especially for military aircraft and weapon systems applications and for civilian aviation. Inaccurate positioning information can result in less accurate GPS-guided weapons which may increase collateral damage as well as a need for an increased number of weapons needed to accomplish a given mission. Additionally, civilian aviation applications rely on GPS positioning information to be highly accurate for aircraft navigation.

A next generation or version of GPS that is being developed is GPS III which has a higher accuracy requirement, yet includes design considerations that may affect this higher accuracy requirement. In particular, GPS III is implemented with a steerable spot beam antenna that is used to transmit high-intensity spot beams of GPS signals. However, the high gain of a spot beam antenna is obtained at the cost of reduced beamwidth, and precision pointing of the narrow beam is needed for the higher accuracy requirements of the GPS III system. As such, the gyros that control the attitude of the GPS satellite need to be calibrated for gyro drift errors.

Gyro measurements are not absolute, but rather relative to some frame of reference. For typical satellite gyros, this frame of reference is a computed inertial frame, where the orientation drifts from a true inertial frame due to various sources such as measurement noise, scale factor error, gyro bias error, and others. In order to provide accurate attitude and rate estimates, the gyros need to be calibrated frequently with a reference attitude sensor.

SUMMARY

This summary introduces simplified features and concepts of GPS gyro calibration which are further described below in the Detailed Description. This summary is not intended to identify essential features of the claimed subject matter, nor is it intended for use in determining the scope of the claimed subject matter.

In an embodiment of GPS gyro calibration, a ground station can receive antenna position data for a spot beam antenna from a global positioning system (GPS) platform where the antenna position data indicates a boresight direction of the spot beam antenna. GPS-enabled receiver(s) can receive scan signals transmitted via the spot beam antenna of the GPS platform, and the GPS-enabled receivers can determine signal power measurements for each of the scan signals. The ground station can receive the signal power measurements from the GPS-enabled receiver(s) and estimate a pointing error of the spot beam antenna based on the signal power measurements and the antenna position data received from the GPS platform. The ground station can then determine gyro calibration parameters from the estimated pointing error and communicate the gyro calibration parameters to the GPS platform to calibrate for gyro drift errors.

BRIEF DESCRIPTION OF THE DRAWINGS

Embodiments of GPS gyro calibration are described with reference to the following drawings. The same numbers are used throughout the drawings to reference like features and components.

DETAILED DESCRIPTION

GPS gyro calibration methods and systems are described in which embodiments provide for GPS platform attitude estimation and gyro drift calibration using a GPS spot beam antenna and GPS-enabled receivers for a gyro measurement reference. A GPS platform, or GPS payload platform, can include any type of aircraft, satellite, airborne system, or airborne device that incorporates a GPS system to transmit GPS positioning signals. GPS gyro calibration can be implemented to correct for antenna pointing errors that are caused by gyro drift errors due to rate bias, scale factor, and measurement noise.

While features and concepts of the described systems and methods for GPS gyro calibration can be implemented in any number of different environments, systems, and/or configurations, embodiments of GPS gyro calibration are described in the context of the following exemplary environment and system architectures.

Figure 1:
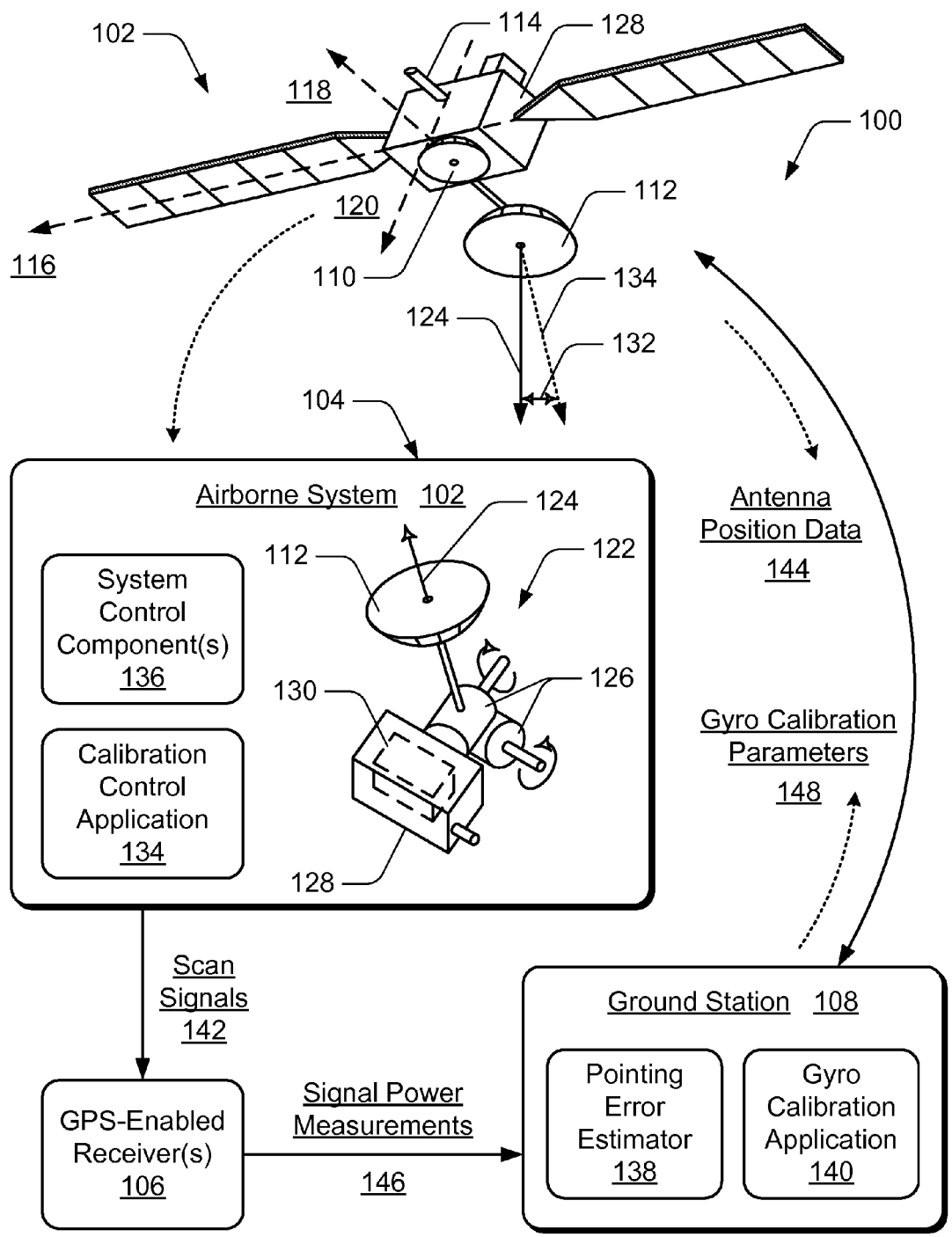
FIG. 1 illustrates an exemplary environment in which embodiments of GPS gyro calibration can be implemented.

FIG. 1 illustrates an exemplary environment 100 in which embodiments of GPS gyro calibration can be implemented. The environment 100 includes an airborne system 102, such as a GPS platform, satellite, aircraft, and/or any other type of GPS-enabled device or system. The environment 100 also includes components 104 of the airborne system 102, mobile ground-based or airborne receiver(s) 106, and a ground station 108. In this example, the airborne system 102 is a GPS platform that is depicted as a GPS satellite which includes a wide beam antenna 110 (also referred to as an "Earth coverage antenna"), and includes a spot beam antenna 112 (also referred to as a "steerable" spot beam antenna). The wide beam antenna 110 and the spot beam antenna 112 each transmit GPS positioning information and navigation messages to the GPS enabled receiver(s) 106. The spot beam antenna 112 provides for the transmission of high intensity spot beams to selected points on the ground without requiring excessive transmitter power.

In this example, the GPS platform 102 (e.g., airborne system 102) includes a telemetry and command antenna 114 which can be utilized to communicate with the ground station 108. In various embodiments, the GPS platform 102 can be implemented with any number of different sensors to measure and/or determine an attitude of the satellite, where the "attitude" refers generally to an orientation of an airborne system in space according to latitude and longitude coordinates relative to the orbital plane. The GPS platform can be stabilized along three-axes that, in this example, are illustrated as a pitch axis 116, a roll axis 118, and a yaw axis 120.

The airborne system 102 includes an antenna positioning system 122 to position a boresight 124 of the spot beam antenna 112, where the boresight refers generally to the axis of an antenna, or a direction of the highest power density transmitted from an antenna. In this example, the antenna positioning system 122 includes a gimbals assembly 126, a housing assembly 128, and roll, pitch, and yaw gyros 130 which can each drift from an orientation reference due to rate bias, scale factor, and measurement noise. Gyro drift errors of the gyros 130 can cause enough variance in the antenna positioning system 122 to cause spot beam antenna pointing error(s) when transmitting GPS signals. A pointing error 132 results in a spot beam 134 that is angularly displaced from a commanded spot beam at the antenna boresight 124.

The airborne system 102 includes a calibration control application 134 (in the components 104) to implement embodiments of GPS gyro calibration. The airborne system 102 also includes various system control component(s) 136 which can include an attitude control system, system controllers, antenna control modules, navigation signal transmission system(s), sensor receivers and controllers, and any other types of controllers and systems to control the operation of the airborne system 102. In addition, the airborne system 102, the receiver(s) 106, and/or the ground station 108 may be implemented with any number and combination of differing components as further described below with reference to the exemplary computing-based device 500 shown in FIG. 5. For example, the receiver 106 and the ground station 108 may be implemented as computing-based devices that include any one or combination of the components described with reference to the exemplary computing-based device 500.

In this example, the ground station 108 includes a pointing error estimator 138 and a gyro calibration application 140 to implement embodiments of GPS gyro calibration. In an embodiment, the GPS platform 102 transmits scan signals 142 to the GPS enabled receiver(s) 106 via the spot beam antenna 112. For example, the scan signals 142 can be transmitted to the GPS-enabled receivers 106 via the spot beam 134 which is an inaccurate boresight direction of the spot beam antenna 112.

The scan signals 142 can be transmitted to the GPS enabled receiver(s) 106 with a known amplitude and in a pattern of a pre-determined scan profile. For example, The GPS platform gimbals assembly 126 of the antenna positioning system 122 can slew the spot beam antenna 112 across one or more of the GPS enabled receivers 106 in a known, cross scan pattern. The spot beam antenna 112 can be slewed at a low rate (e.g., 0.1 deg/sec) in azimuth and elevation coordinate frames utilizing a scan pattern that is large enough to produce a noticeable change in signal-to-noise ratio (or carrier to noise) measurements.

The GPS enabled receiver(s) 106 can receive the scan signals 142 transmitted via the spot beam antenna 112 of the GPS platform 102 and determine signal power measurements for each of the scan signals. In an embodiment, the signal power measurements can be determined as signal-to-noise ratio measurements of the scan signals 142. The GPS enabled receiver(s) 106 can also time-tag, or otherwise indicate a time at which a scan signal is received such that each of the scan signals 142 can be correlated with antenna position data 144 to estimate the pointing error 132 of the spot beam antenna 112. The GPS-enabled receiver(s) 106 can then communicate the signal power measurements 146 to the ground station 108.

The GPS platform transmits, or communicates, the antenna position data 144 for the spot beam antenna to the ground station 108 where the antenna position data indicates the inaccurate boresight direction 134 of the spot beam antenna 112. Alternatively, the GPS platform 102 can be commanded to point the boresight direction of the spot beam antenna 112 at a particular latitude and longitude where a GPS enabled receiver 106 is located. The accurate latitude and longitude coordinates can also be obtained from the GPS enabled receiver.

The ground station 108 can receive the signal power measurements 146 from the GPS enabled receiver(s) 106. The pointing error estimator 138 at the ground station 108 estimates the pointing error 132 of the spot beam antenna 112 based on the signal power measurements 146 and the antenna position data 144 received from the GPS platform 102. The difference between where a signal-to-noise ratio is measured and where it was expected to be provides an estimate of the antenna pointing error.

The gyro calibration application 140 at the ground station 108 can be implemented to determine gyro calibration parameters from the estimated pointing error 132. The gyro calibration parameters can include a rate bias and a scale factor communicated to the GPS platform. In an embodiment, antenna pointing error measurements are input to a Kalman filter algorithm to estimate the gyro calibration parameters 148 to calibrate for the gyro drift errors.

The gyro rate bias and the scale factor parameters can be resolved for all of the gyros 130 in the three different axes (i.e., pitch axis 116, roll axis 118, and yaw axis 120) by the gyro equation:

$$\omega_{gyro} = (1+SF)\omega_{true} + b_{gyro} + \eta_r$$

where $\omega_{gyro}$ is a gyro reading, SF is the gyro scale factor, $\omega_{true}$ is a true airborne system body rate, $b_{gyro}$ is the gyro rate bias, and $\eta_r$ is the rate noise. Given the $\omega_{gyro}$ gyro reading, the gyro rate bias and the scale factor can be estimated. Estimating the gyro calibration parameters utilizing a Kalman filter algorithm is further described in a document "Precision Spacecraft Attitude Estimators Using an Optical Payload Pointing System", Jonathan A. Tekawy (Journal of Spacecraft and Rockets Vol. 35, No. 4, July-August 1998, pages 480-486), which is incorporated by reference herein.

The ground station 108 can communicate or otherwise upload the gyro calibration parameters 148 to the GPS platform 102 where the calibration control application 134 can calibrate the gyros 130 for the gyro drift errors. The gyro calibration parameters 148 that are uploaded to the GPS platform can also contain information to correct for the gyro rate output and to provide accurate rate and attitude estimates. With the corrected gyro estimates, the GPS platform 102 can more accurately point both the GPS Earth coverage antenna 110 and the spot beam antenna 112.

Embodiments of GPS gyro calibration as described herein also improves the effectiveness of GPS anti-jamming, minimizes unintentional RF interference to other systems, eliminates the need for on orbit gyro calibration using a large, fixed ground antenna, and provides for the use of portable and readily available GPS enabled receivers which improves satellite observability by allowing calibration over a wide geographical area. GPS gyro calibration also provides for fewer measurements which provides for faster convergence and a more accurate gyro parameter estimate as compared to using fixed ground antennas.

Generally, any of the functions described herein can be implemented using software, firmware (e.g., fixed logic circuitry), hardware, manual processing, or a combination of these implementations. A software implementation represents program code that performs specified tasks when executed on processor(s) (e.g., any of microprocessors, controllers, and the like). The program code can be stored in one or more computer readable memory devices, examples of which are described with reference to the exemplary computing-based device 500 shown in FIG. 5. Further, the features of GPS gyro calibration as described herein are platform-independent such that the techniques may be implemented on a variety of commercial computing platforms having a variety of processors.

Methods for GPS gyro calibration, such as exemplary methods 200, 300, and 400 described with reference to respective FIGS. 2, 3, and 4 may be described in the general context of computer executable instructions. Generally, computer executable instructions can include routines, programs, objects, components, data structures, procedures, modules, functions, and the like that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

Figure 2:
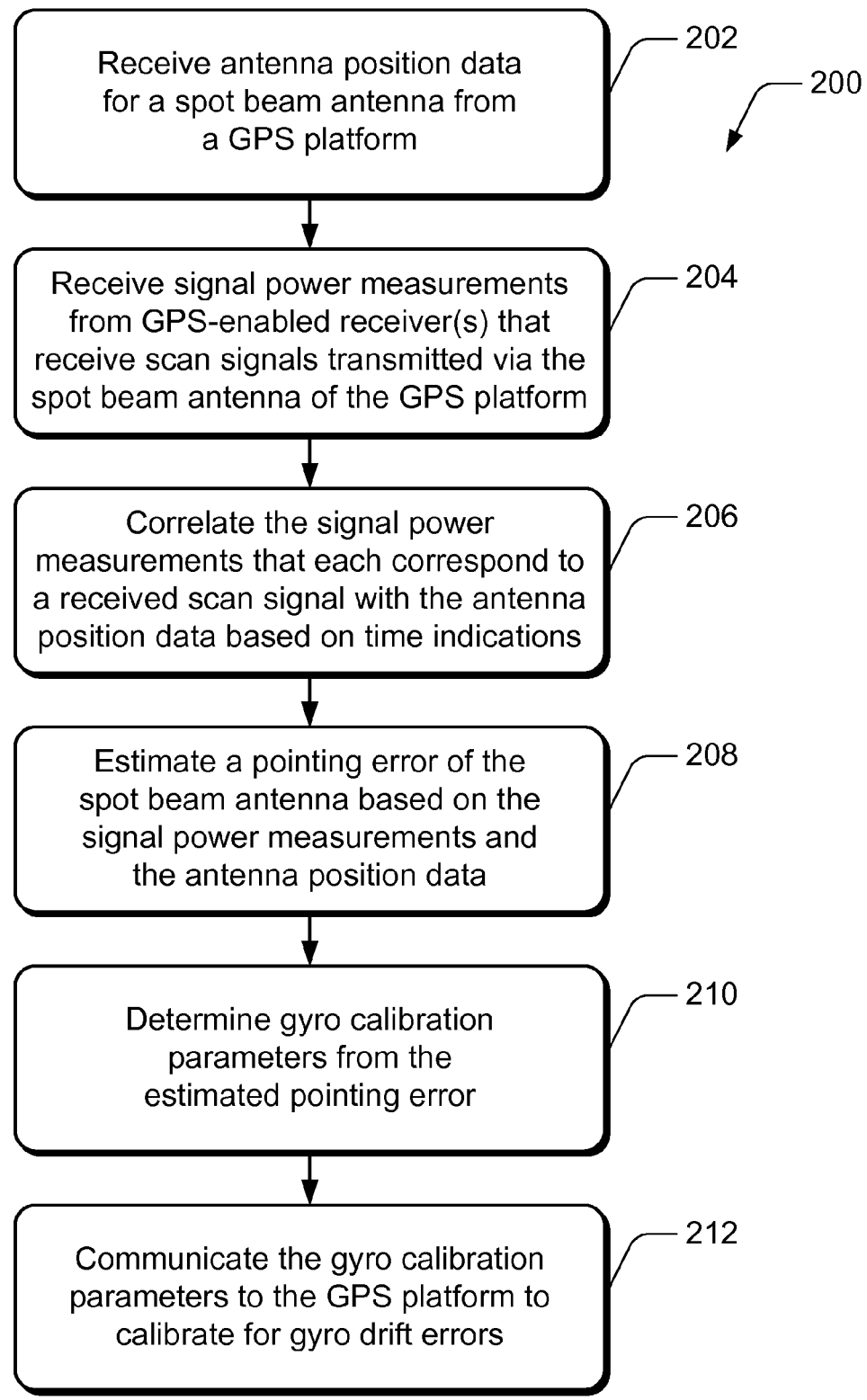
FIG. 2 illustrates exemplary method(s) for GPS gyro calibration.

FIG. 2 illustrates an exemplary method 200 for GPS gyro calibration and is described with reference to the exemplary environment 100 shown in FIG. 1, and with reference to the ground station 108. The order in which the method is described is not intended to be construed as a limitation, and any number of the described method blocks can be combined in any order to implement the method, or an alternate method. Furthermore, the method can be implemented in any suitable hardware, software, firmware, or combination thereof.

At block 202, antenna position data for a spot beam antenna is received from a global positioning system (GPS) platform. For example, the ground station 108 (FIG. 1) receives antenna position data 144 from the GPS platform 102 for the spot beam antenna 112. The antenna position data 144 can indicate a boresight direction 134 of the spot beam antenna 112.

At block 204, signal power measurements are received from one or more GPS enabled receivers that receive scan signals transmitted via the spot beam antenna of the GPS platform. For example, the GPS enabled receiver(s) 106 receive scan signals 142 via the spot beam antenna 112 of the GPS platform 102, and determine signal power measurements 146 for each of the scan signals. The scan signals 142 can be transmitted via the spot beam antenna 112 of the GPS platform 102 to the GPS enabled receiver(s) 106 in a pattern of a predetermined scan profile that corresponds to the antenna position data 144 of the spot beam antenna 112. The ground station 108 then receives the signal power measurements 146 from the GPS enabled receiver(s) 106, and in an embodiment, can receive the signal power measurements as signal-to-noise ratio measurements.

At block 206, the signal power measurements that each correspond to a received scan signal are correlated with the antenna position data based on time indications that are assigned to each scan signal received by a GPS enabled receiver. For example, a GPS enabled receiver 106 can time-tag, or otherwise time-base indicate, when a scan signal 142 is received such that the ground station 108 can then correlate the signal power measurements 146 with the antenna position data 144.

At block 208, a pointing error of the spot beam antenna is estimated based on the signal power measurements and the antenna position data. For example, the pointing error estimator 138 implemented at the ground station 108 estimates a pointing error 132 of the spot beam antenna 112 based on the signal power measurements 146 and the antenna position data 144.

At block 210, gyro calibration parameters are determined from the estimated pointing error. For example, the gyro calibration application 140 implemented at the ground station 108 determines gyro calibration parameters 148 for the GPS platform 102 from the estimated pointing error. In an embodiment, the gyro calibration parameters include a rate bias and a scale factor of the gyro drift errors. A corrected boresight direction of the spot beam antenna 112 can be determined from the gyro calibration parameters 148.

At block 212, the gyro calibration parameters are communicated to the GPS platform to calibrate for gyro drift errors. For example, the ground station 108 communicates, or otherwise uploads, the gyro calibration parameters 148 to the GPS platform 102 where the calibration control application 134 calibrates for the gyro drift errors of the gyros 130.

Figure 3:
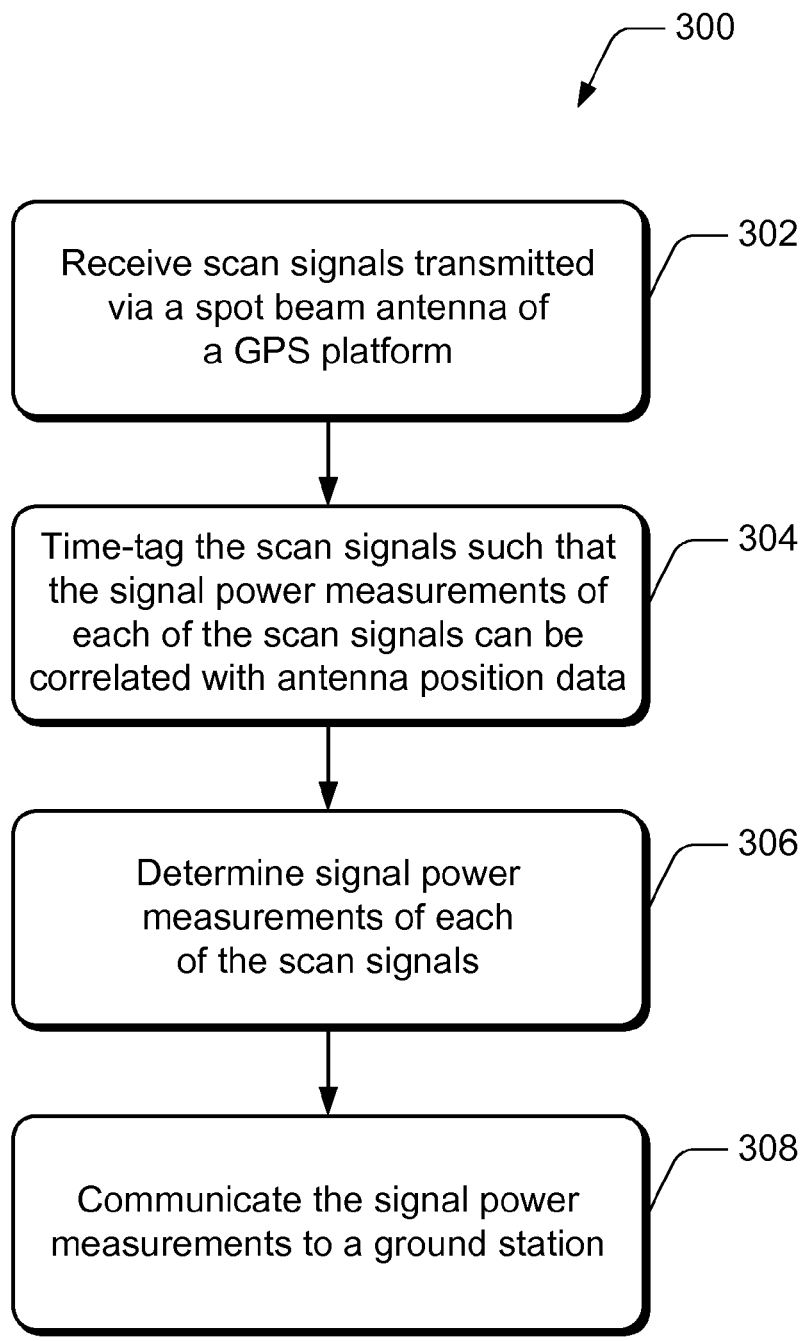
FIG. 3 illustrates exemplary method(s) for GPS gyro calibration.

FIG. 3 illustrates an exemplary method 300 for GPS gyro calibration and is described with reference to the exemplary environment 100 shown in FIG. 1, and with reference to a GPS-enabled receiver 106. The order in which the method is described is not intended to be construed as a limitation, and any number of the described method blocks can be combined in any order to implement the method, or an alternate method. Furthermore, the method can be implemented in any suitable hardware, software, firmware, or combination thereof.

At block 302, scan signals transmitted via a spot beam antenna of a global positioning system (GPS) platform are received. For example, the GPS enabled receiver(s) 106 (FIG. 1) receive the scan signals 142 that are transmitted via the spot beam antenna 112 of the GPS platform 102. The GPS enabled receiver(s) 106 can receive the scan signals 142 which may be transmitted from the GPS platform 102 with a known amplitude, and scanned in a pattern of a predetermined scan profile.

At block 304, the scan signals are time-tagged when received such that the signal power measurements of each of the scan signals can be correlated with antenna position data to estimate the pointing error of the spot beam antenna. For example, the GPS enabled receiver(s) 106 time-tag, or otherwise time-base indicate, when a scan signal 142 is received such that the ground station 108 can then correlate the signal power measurements 146 with the antenna position data 144.

At block 306, signal power measurements of each of the scan signals are determined. For example, the GPS enabled receiver(s) 106 determine the signal power measurements 146, which in an embodiment, can be determined as signal to noise ratio measurements.

At block 308, the signal power measurements are communicated to a ground station. For example, the GPS enabled receiver(s) 106 communicate the signal power measurements 146 to the ground station 108 that: estimates a pointing error of the spot beam antenna 112 based on the signal power measurements 146 and the antenna position data 144 received from the GPS platform 102; determines gyro calibration parameters 148 (e.g., a rate bias and a scale factor) from the estimated pointing error; and communicates the gyro calibration parameters 48 to the GPS platform 102 to calibrate for gyro drift errors of the gyros 130.

Figure 4:
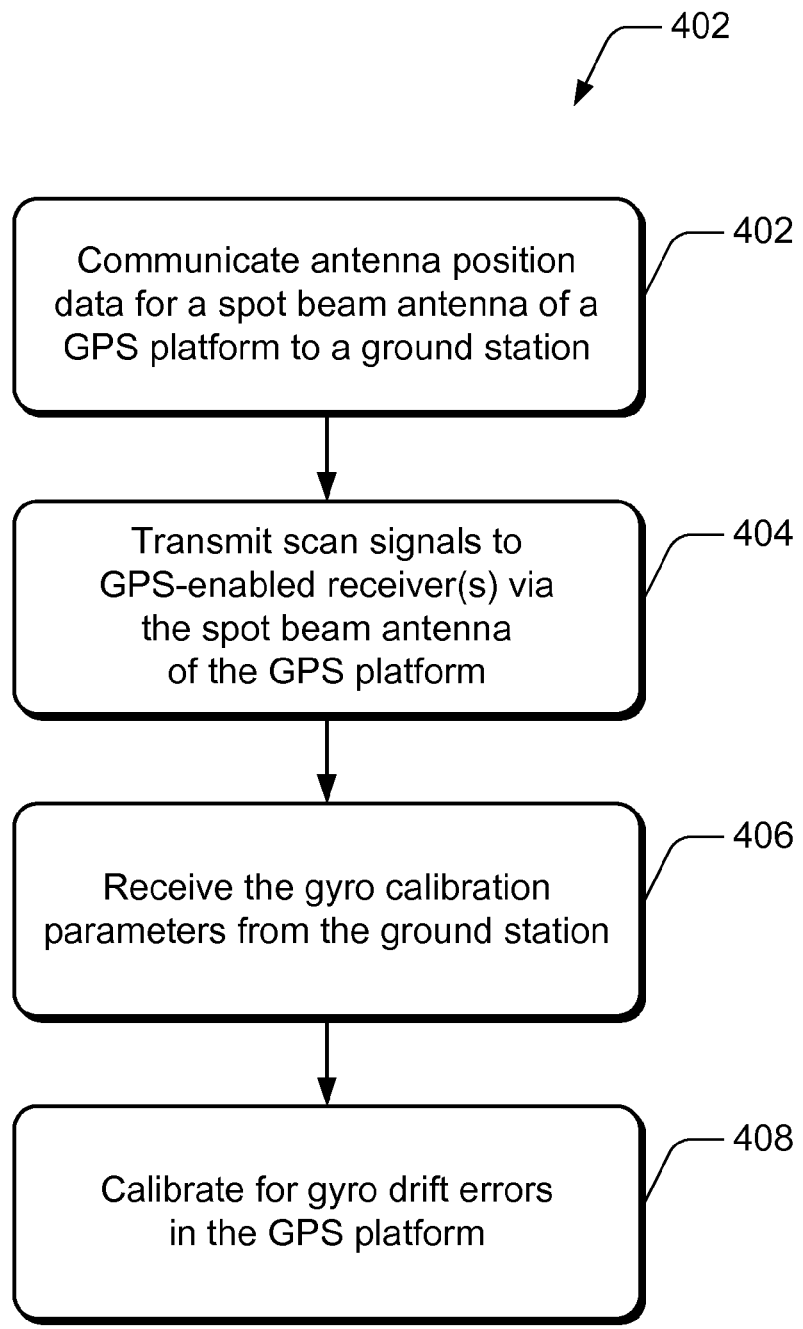
FIG. 4 illustrates exemplary method(s) for GPS gyro calibration.

FIG. 4 illustrates an exemplary method 400 for GPS gyro calibration and is described with reference to the exemplary environment 100 shown in FIG. 1, and with reference to the GPS platform 102. The order in which the method is described is not intended to be construed as a limitation, and any number of the described method blocks can be combined in any order to implement the method, or an alternate method. Furthermore, the method can be implemented in any suitable hardware, software, firmware, or combination thereof.

At block 402, antenna position data for a spot beam antenna of a global positioning system (GPS) platform is communicated to a ground station. For example, the GPS platform 102 (FIG. 1) communicates the antenna position data 144 to the ground station 108. The antenna position data 144 can indicate a boresight direction of the spot beam antenna 112.

At block 404, scan signals are transmitted to one or more GPS enabled receivers via the spot beam antenna of the GPS platform. For example, the GPS platform 102 transmits the scan signals 142 to the GPS enabled receiver(s) 106, where each receiver then determines the signal power measurements 146 for each of the scan signals 142 and communicates the signal power measurements 146 to the ground station 108. The ground station then estimates a pointing error of the spot beam antenna 112 based on the signal power measurements 146 and the antenna position data 144 received from the GPS platform 102, and determines gyro calibration parameters 148 from the estimated pointing error.

At block 406, the gyro calibration parameters are received from the ground station. For example, the GPS platform 102 receives the gyro calibration parameters 148 from the ground station 108, where the gyro calibration parameters 148 include a rate bias and a scale factor to calibrate for the gyro drift errors in the GPS platform. At block 408, the gyro drift errors are calibrated in the GPS platform. For example, the calibration control application 134 can determine a corrected boresight direction of the spot beam antenna 112 from the gyro calibration parameters 148 and calibrate the gyros 130 for the gyro drift errors.

Figure 5:
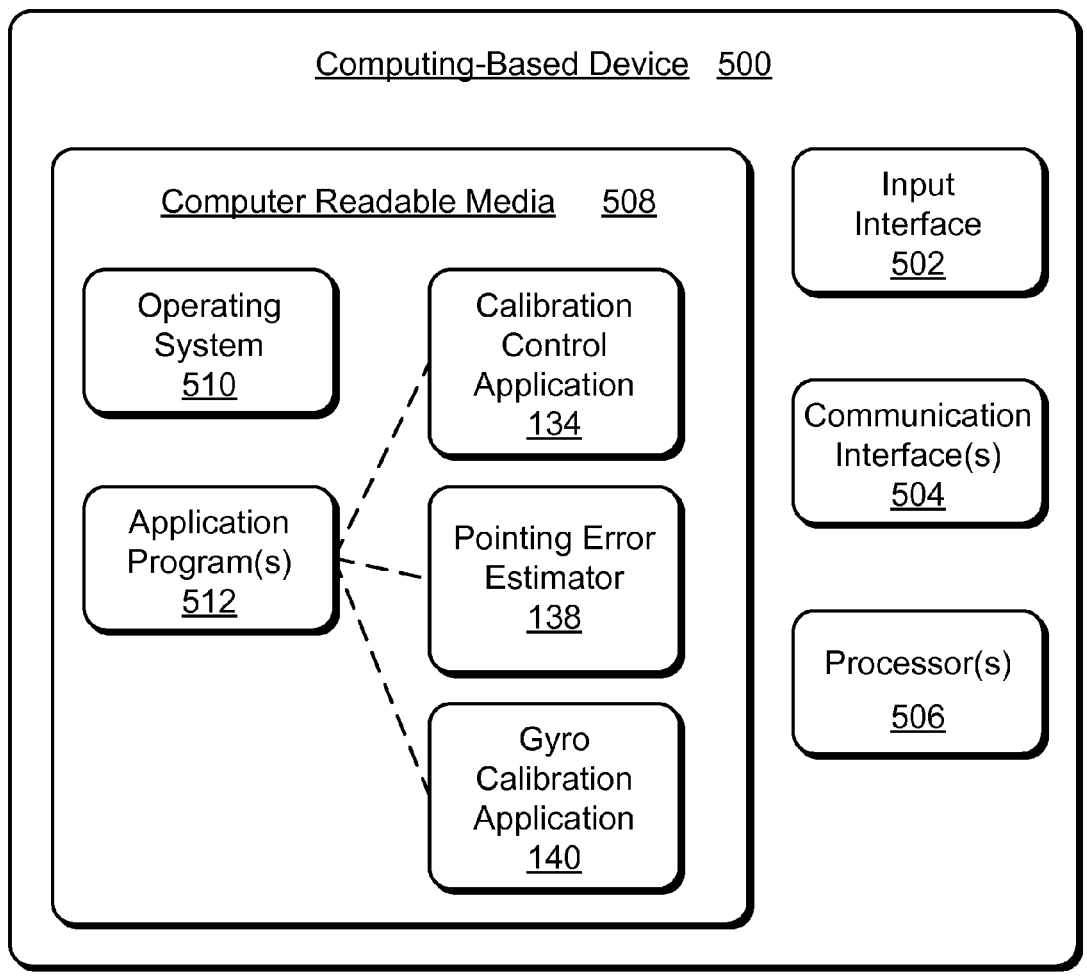
FIG. 5 illustrates various components of an exemplary computing-based device in which embodiments of GPS gyro calibration can be implemented.

FIG. 5 illustrates various components of an exemplary computing-based device 500 which can be implemented as any form of computing or electronic device in which embodiments of GPS gyro calibration can be implemented. For example, the computing-based device 500 can be implemented to include any one or combination of components described with reference to the exemplary environment 100 (FIG. 1).

The computing-based device 500 includes an input interface 502 by which any type of data inputs can be received, such as from any airborne system components, sensors, systems, and/or subsystems. Device 500 further includes communication interface(s) 504 which can be implemented as any one or more of a serial and/or parallel interface, a wireless interface, any type of network interface, and as any other type of communication interface for external communication such as via a satellite link to communicate with the ground station 108.

The computing-based device 500 also includes one or more processors 506 (e.g., any of microprocessors, controllers, and the like) which process various computer executable instructions to control the operation of computing-based device 500, to communicate with other electronic and computing devices, and to implement embodiments of GPS gyro calibration. Computing-based device 500 can also be implemented with computer readable media 508, such as one or more memory components, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), a DVD, a DVD+RW, and the like.

Computer readable media 508 provides data storage mechanisms to store various information and/or data such as software applications and any other types of information and data related to operational aspects of computing-based device 500. For example, an operating system 510 and/or other application programs 512 can be maintained as software applications with the computer readable media 508 and executed on processor(s) 506 to implement embodiments of GPS gyro calibration.

For example, the calibration control application 134 can be implemented as a software application component to implement embodiments of GPS gyro calibration in the airborne system 102. Similarly, the pointing error estimator 138 and the gyro calibration application 140 can be implemented as software application components to implement embodiments of GPS gyro calibration in the ground station 108.

Although the calibration control application 134, pointing error estimator 138, and the gyro calibration application 140 are each described as single applications, each of the applications can themselves be implemented as several component modules or applications distributed to each perform one or more functions of GPS gyro calibration. In addition, the pointing error estimator 138 and the gyro calibration application 140 can be implemented together as a single application to perform one or more functions of GPS gyro calibration at the ground station 108.

Although embodiments of GPS gyro calibration have been described in language specific to structural features and/or methods, it is to be understood that the subject of the appended claims is not necessarily limited to the specific features or methods described. Rather, the specific features and methods are disclosed as exemplary implementations of GPS gyro calibration.

The invention claimed is:

1. A method to calibrate a global positioning system (GPS) gyro, comprising:
    receiving, in a GPS enabled receiver, one or more scan signals transmitted via a spot beam antenna of a GPS platform;
    determining, in the GPS enabled receiver, one or more signal power measurements of each of the scan signals; and
    communicating the signal power measurements from the GPS enabled receiver to a ground station that:
        (i) estimates a pointing error of the spot beam antenna based on the signal power measurements and antenna position data received from the GPS platform,
        (ii) determines gyro calibration parameters from the estimated pointing error, and
        (iii) communicates the gyro calibration parameters to the GPS platform to calibrate for gyro drift errors.

2. The method of claim 1, wherein the scan signals are received at the GPS-enabled receiver which includes at least one of: a stationary GPS-enabled receiver; a mobile GPS-enabled receiver; multiple GPS-enabled receivers.

3. The method of claim 1, further comprising time-tagging the scan signals when received at the GPS enabled receiver for the ground station to correlate the signal power measurements of each of the scan signals with the antenna position data to estimate the pointing error of the spot beam antenna.

4. The method of claim 1, wherein the scan signals are transmitted from the GPS platform with a known amplitude, and wherein the scan signals are received in a pattern of a pre-determined scan profile.

5. The method of claim 1, wherein the signal power measurements are determined as signal-to-noise ratio measurements at the GPS-enabled receiver.

6. The method of claim 1, wherein the gyro calibration parameters include a rate bias and a scale factor communicated to the GPS platform which calibrates for the gyro drift errors.

7. A system to calibrate a global positioning system (GPS) gyro, comprising:
a GPS enabled receiver to receive one or more scan signals transmitted via a spot beam antenna of a GPS platform and determine one or more signal power measurements of each of the scan signals; and
a ground station communicatively coupled to the GPS receiver to:
receive the one or more signal power measurements from the GPS enabled receiver to a ground station;
estimate a pointing error of the spot beam antenna based on the signal power measurements and antenna position data received from the GPS platform,
determine one or more gyro calibration parameters from the estimated pointing error, and
communicate the one or more gyro calibration parameters to the GPS platform to calibrate for gyro drift errors.

8. The system of claim 7, wherein the GPS-enabled receiver includes at least one of:
a stationary GPS-enabled receiver;
a mobile GPS-enabled receiver; and
multiple GPS-enabled receivers.

9. The system of claim 7, wherein the GPS enabled receiver time tags the scan signals when received at the GPS enabled receiver for the ground station to correlate the signal power measurements of each of the scan signals is correlated with the antenna position data to estimate the pointing error of the spot beam antenna.

10. The system of claim 7, wherein the GPS platform transmits the scan signals with a known amplitude, and wherein the scan signals are received in a pattern of a predetermined scan profile.

11. The system of claim 7, wherein the GPS enabled receiver determines the one or more signal power measurements as signal-to-noise ratio measurements.

12. The system of claim 7, wherein the gyro calibration parameters include a rate bias and a scale factor communicated to the GPS platform which calibrates for the gyro drift errors.

13. A method to calibrate a global positioning system (GPS) gyro, comprising:
receiving, at a ground station, antenna position data for a spot beam antenna from a GPS platform, the antenna position data indicating a boresight direction of the spot beam antenna;
receiving, at the ground station, one or more signal power measurements from one or more GPS-enabled receivers that receive scan signals transmitted from the spot beam antenna of the GPS platform, wherein the signal power measurements are determined for each of the scan signals;
estimating a pointing error of the spot beam antenna based on the one or more signal power measurements and the antenna position data;
determining one or more gyro calibration parameters from the pointing error; and
communicating the one or more gyro calibration parameters to the GPS platform to calibrate for gyro drift errors.

14. The method of claim 13, further comprising correlating the one or more signal power measurements that correspond to a received scan signal with the antenna position data based on one or more time indications assigned to each scan signal received by a GPS-enabled receiver.

15. The method of claim 13, wherein the one or more signal power measurements are received from a GPS-enabled receiver that includes at least one of a stationary GPS-enabled receiver or a mobile GPS-enabled receiver.

16. The method of claim 13, further comprising determining a corrected boresight direction of the spot beam antenna from the gyro calibration parameters.

17. The method of claim 13, wherein the gyro calibration parameters include a rate bias and a scale factor communicated to the GPS platform which calibrates for the gyro drift errors.

18. The method of claim 13, wherein the signal power measurements are received from the one or more GPS-enabled receivers as signal-to-noise ratio measurements.

19. The method of claim 13, wherein the scan signals are transmitted via the spot beam antenna of the GPS platform to the one or more GPS-enabled receivers in a pattern of a pre-determined scan profile that corresponds to the antenna position data of the spot beam antenna.

20. A system to calibrate global positioning system (GPS) gyro, comprising:
a ground station to:
receive antenna position data for a spot beam antenna from a GPS platform, the antenna position data indicating a boresight direction of the spot beam antenna;
receive one or more signal power measurements from one or more GPS-enabled receivers that receive scan signals transmitted from the spot beam antenna of the GPS platform, wherein the signal power measurements are determined for each of the scan signals;
estimate a pointing error of the spot beam antenna based on the one or more signal power measurements and the antenna position data;
determine one or more gyro calibration parameters from the pointing error; and
communicate the one or more gyro calibration parameters to the GPS platform to calibrate for gyro drift errors.

21. The system of claim 20, wherein the ground station correlates the one or more signal power measurements that correspond to a received scan signal with the antenna position data based on one or more time indications assigned to each scan signal received by a GPS-enabled receiver.

22. The system of claim 20, wherein the one or more signal power measurements are received from a GPS-enabled receiver that includes at least one of a stationary GPS-enabled receiver or a mobile GPS-enabled receiver.

23. The system of claim 20, wherein the ground station determines a corrected boresight direction of the spot beam antenna from the gyro calibration parameters.

24. The system of claim 20, wherein the gyro calibration parameters include a rate bias and a scale factor communicated to the GPS platform which calibrates for the gyro drift errors.

25. The system of claim 20, wherein the signal power measurements are received from the one or more GPS-enabled receivers as signal-to-noise ratio measurements.

26. The system of claim 20, wherein the scan signals are transmitted via the spot beam antenna of the GPS platform to the one or more GPS-enabled receivers in a pattern of a pre-determined scan profile that corresponds to the antenna position data of the spot beam antenna.

27. A method to calibrate a global positioning system (GPS) gyro, comprising:
communicating antenna position data for a spot beam antenna of a global positioning system (GPS) platform to a ground station, the antenna position data indicating a boresight direction of the spot beam antenna;
transmitting scan signals from an airborne system to one or more GPS-enabled receivers via the spot beam antenna of the GPS platform, wherein the one or more GPS-enabled receivers are configured to:
  determine signal power measurements for each of the scan signals; and
  communicate the signal power measurements to the ground station, wherein the ground station estimates a pointing error of the spot beam antenna based on the signal power measurements and the antenna position data received from the GPS platform, and determines gyro calibration parameters from the estimated pointing error;
receiving the gyro calibration parameters from the ground station; and
calibrating for gyro drift errors in the GPS platform.

28. The method of claim 27, wherein the scan signals are transmitted to a GPS-enabled receiver that includes at least one of: a stationary GPS-enabled receiver; a mobile GPS-enabled receiver.

29. The method of claim 27, wherein the scan signals are transmitted to the one or more GPS-enabled receivers with a known amplitude and in a pattern of a pre-determined scan profile, the pattern of the predetermined scan profile being defined by the GPS platform slewing the spot beam antenna across one or more of the GPS enabled receivers in a cross-scan pattern, the slewing performed at a low rate in azimuth, and elevation coordinate frames utilizing a scan pattern that produces a measurable change in signal-to-noise ratio measurements.

30. The method of claim 27, wherein the one or more GPS-enabled receivers each determine the signal power measurements for the scan signals as signal-to-noise ratio measurements that are communicated to the ground station.

31. The method of claim 27, wherein a rate bias and a scale factor are received as the gyro calibration parameters from the ground station to calibrate for the gyro drift errors in the GPS platform.

32. The method of claim 27, further comprising determining a corrected boresight direction of the spot beam antenna from the gyro calibration parameters.

* * * * *